United States Patent
Spahn

(10) Patent No.: US 6,912,266 B2
(45) Date of Patent: Jun. 28, 2005

(54) X-RAY DIAGNOSTIC FACILITY HAVING A DIGITAL X-RAY DETECTOR AND A STRAY RADIATION GRID

(75) Inventor: Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 10/420,158

(22) Filed: Apr. 22, 2003

(65) Prior Publication Data

US 2003/0235273 A1 Dec. 25, 2003

(30) Foreign Application Priority Data

Apr. 22, 2002 (DE) .......................................... 102 17 890

(51) Int. Cl.⁷ ............................. H05G 1/64; G21K 1/00
(52) U.S. Cl. .................. 378/98.8; 378/154; 250/370.09
(58) Field of Search ......................... 378/19, 98.8, 154; 250/370.09, 370.11

(56) References Cited

U.S. PATENT DOCUMENTS

| | | | |
|---|---|---|---|
| 4,951,305 A | 8/1990 | Moore et al. | |
| 5,166,961 A | * 11/1992 | Brunnett et al. | 378/19 |
| 5,617,461 A | 4/1997 | Schreiner | |
| 5,949,850 A | 9/1999 | Tang | |
| 6,177,237 B1 | 1/2001 | Guida et al. | |
| 6,366,643 B1 | 4/2002 | Davis et al. | |
| 6,408,054 B1 | * 6/2002 | Rahn et al. | 378/154 |
| 2002/0018543 A1 | * 2/2002 | Danielsson | 378/98.8 |

FOREIGN PATENT DOCUMENTS

| | | |
|---|---|---|
| EP | 1 126 289 | 8/2001 |
| JP | 07-084057 | 3/1995 |

* cited by examiner

Primary Examiner—Craig E. Church
Assistant Examiner—Thomas R. Artman
(74) Attorney, Agent, or Firm—Schiff Hardin LLP

(57) ABSTRACT

An X-ray diagnostic facility has an X-ray device for generating X-rays, a digital X-ray detector for acquiring the X-rays and for converting them into an electrical signal sequence that has picture elements arranged in a first structure, an image system for processing the electrical signal sequence and a playback device, and a stray radiation grid having a second structure composed of highly absorbent material and highly X-ray transparent material in alternation precedes the X-ray detector. One of the first and second structures is irregularly fashioned.

10 Claims, 3 Drawing Sheets

X-RAY DIAGNOSTIC FACILITY HAVING A DIGITAL X-RAY DETECTOR AND A STRAY RADIATION GRID

BACKGROUND OF THE INVENTION

1. Field of the Invention

The present invention is directed to an X-ray diagnostic facility with an X-ray device for generating X-radiation of the type having a digital X-ray detector for acquiring the X-rays and converting them into an electrical signal sequence that has picture elements arranged in a first structure, and having an image system for processing the electrical signal sequence as well as a playback device, and having a stray radiation grid having a second structure of highly absorbent material and highly X-ray transparent material in alternation, preceding the X-ray detector.

2. Description of the Prior Art

Digital X-ray detectors have been changing classic radiography and angiography and cardangiography for years. A wide variety of technologies have already been in use for some time or are about ready for the market namely digital technologies such as image intensifier camera systems based on video or CCD camera, storage film systems with an integrated or external readout unit, systems with optical coupling of the converter foil to CCDs or CMOS chips, selenium-based detectors with electrostatic readout (for example, Thoravision) and solid-state detectors with active readout matrices.

In particular, new solid-state detectors for digital X-ray imaging have been under development for a few years that are based on active readout matrices, for example composed of amorphous silicon (a-Si). The image information is converted in an X-ray converter, for example cesium iodide (CsI), stored in the photodiodes of the matrix as electrical charge, and subsequently read out via an active switch element with dedicated electronics and analog-to-digital converted and further-processed by the image system.

Related technologies likewise employ an active readout matrix of amorphous silicon but a converter (for example, selenium) that directly generates electrical charge that is then stored on an electrode. Other technologies are based on CCDs (charge coupled devices) or APS (active pixel sensor) or CMOS chips.

All of the above-described technologies ultimately make the X-ray information available in digital form, both in terms of position by means of a 2-dimensional pixel structure as well as in terms of the signal amplitude by means of gray values having a given bit depth (length).

For suppressing stray radiation that arises in the examination subject, a stray radiation grid as disclosed, for example, by European Application 1 126 289 can be utilized for improving the image quality in the majority of all examinations. All conventional stray radiation grids are composed of a regular structure of highly absorbent material such as, for example, lead and high X-ray-transparent material such as, for example, paper, in alternation.

Aliasing effects arise due to the combination of two components with regular structures in the position domain—digital X-ray detector with pixel structures, as one component, and a stray radiation grid with absorber lamellae, as the other component. This is particularly the case when the digital X-ray detector has a high modulation transfer function (MTF) in the region of the spatial frequency of the stray radiation grid. These aliasing effects can generate considerable artifacts and overlay diagnostically relevant information.

This effects will play an increasingly greater part in the future due to the introduction of technologies with higher resolution, for example due to smaller pixels, optimized X-ray absorption and/or direct converter materials.

Stray radiation grids have been employed conventionally as moving grids or stationary multi-line grids for individual frames. Stationary grids are employed in angiography and fluoroscopy with high image frequency.

U.S. Pat. Nos. 6,366,643 and 5,949,850 disclose stray radiation grids with regularly repeating, irregular structures. Two equidistant geometrical structures are placed on top of one another.

SUMMARY OF THE INVENTION

An object of the present invention is to prevent the above-described aliasing effects in a simple way.

This object is inventively achieved in an X-ray diagnostic facility of the type initially described wherein one of the two structures is irregularly fashioned. The invention is based on the perception that aliasing effects can be avoided when one of the regular structures is broken up. This can ensue by the lamellae in the stray radiation grid not being equidistantly disposed but being arranged according to a random pattern. Fundamentally, the size of the pixels of the detector also can be randomly generated to generate a similar effect. This, however, is clearly more complicated for practical reasons.

The stray radiation grid is still considered as having an irregular structure even though the average number of lamellae per length unit can be constant over larger distances. The only aim is local "density fluctuations" in order to suppress or reduce the aliasing effects.

It has proven advantageous when the highly absorbent material is lead and the highly X-ray-transparent material is paper.

In a first embodiment of the invention the stray radiation grid has an irregular structure, for example the lamellae are arranged at irregular intervals and the highly absorbent lamellae can be composed of lead and the highly X-ray-transparent material can be composed of paper.

In a second embodiment of the invention the picture elements of the digital X-ray detector are arranged at irregular intervals, i.e., the columns and/or the rows can be arranged at irregular intervals.

Advantageously, the picture elements can have irregular intervals in a direction perpendicular to the lamellae.

It has proven advantageous for the picture elements of the X-ray detector to have irregular sizes.

DESCRIPTION OF THE PREFERRED EMBODIMENTS

Figure 1:
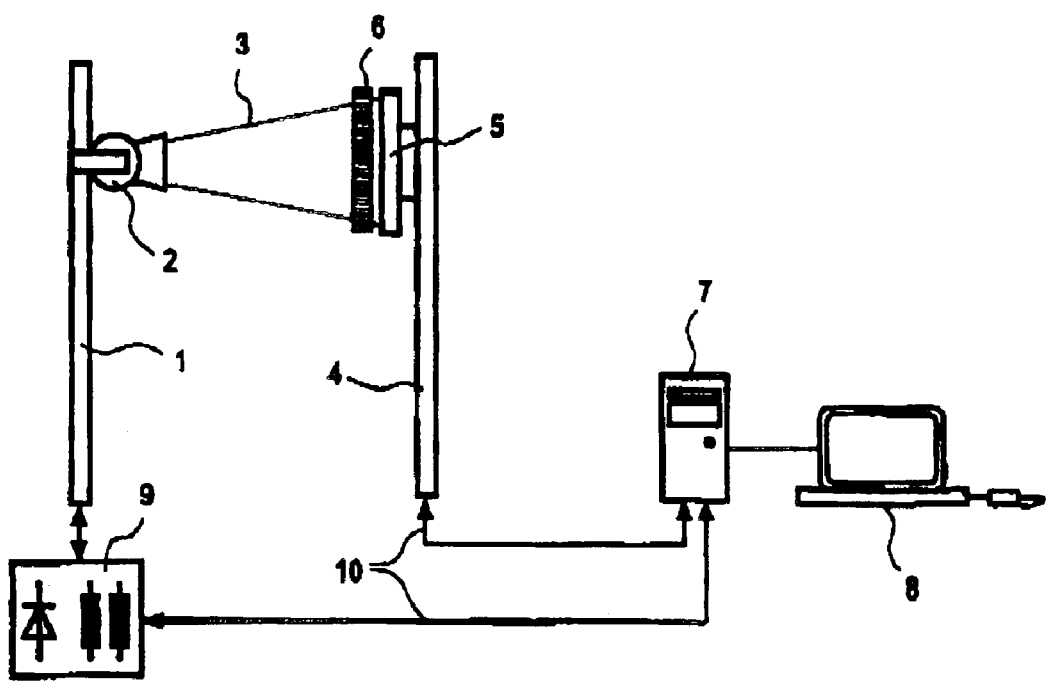
FIG. 1 is a schematic illustration of an overall system with a digital X-ray detector and a stray radiation grid.

FIG. 1 shows an X-ray diagnostics facility of the type disclosed by German PS 195 27 148. The facility has a first stand 1 to which an X-ray radiator 2 is height-adjustably attached, the X-ray radiator 2 generating a conical X-ray 3, and having a second stand 4 to which an X-ray detector 5 is secured such that it is aligned in height to the X-ray radiator 2, so that X-rays are incident on the X-ray detector 5. A stray radiation grid 6 is arranged in front of the X-ray detector 5, the stray radiation grid 6 suppressing the stray radiation arising in the examination subject that is located in the beam path of the X-ray 3. The output signal of the X-ray detector 5 is supplied to an image computer or image system 7. The image system 7 can include computers, converters, image memories and processing circuits. For playback of the acquired X-ray images, the image system is connected to a monitor 8. A high-voltage generator 9 supplies the X-ray tube of the X-radiator 2 with high-voltage and filament voltage. The image system 7 is connected to the remaining components of the X-ray diagnostics facility via control and data lines 10.

Figure 2:
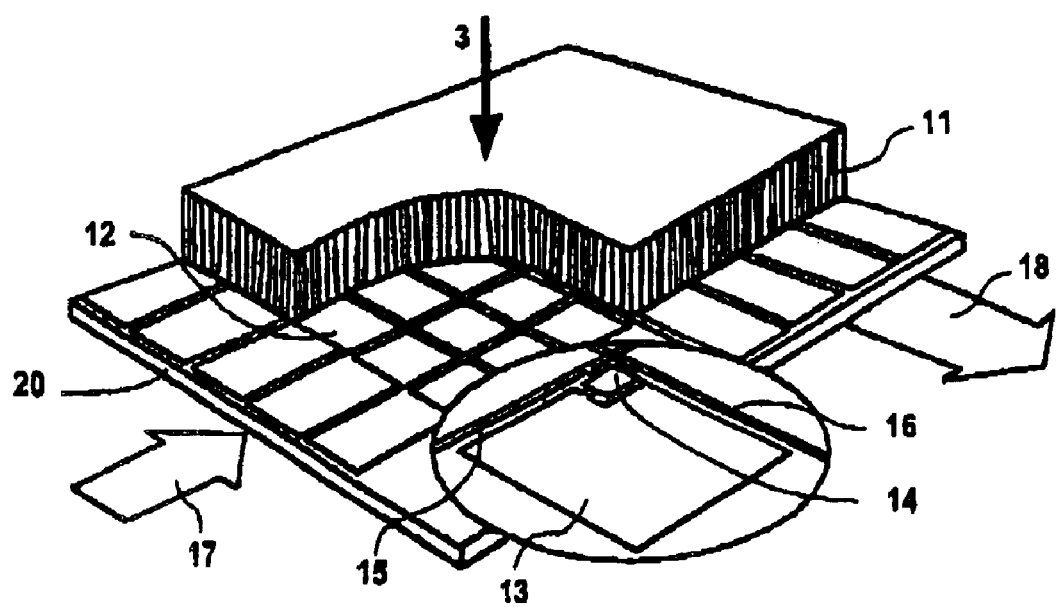
FIG. 2 is a schematic view of a solid-state detector.

FIG. 2 shows the X-ray detector 5 in a perspective cross-section. The core component of the X-ray detector 5 is composed of a solid-state pixel matrix, line drivers and amplifiers. The solid-state pixel matrix is composed, for example, of a layer with a scintillator 11 that, for example, is composed of cesium iodide (CsI) that, given irradiation by X-ray 3, the scintillator 11 emits visible photons into a pixel matrix 12 of amorphous silicon that produce a visible X-ray image. As shown enlarged in FIG. 2, each of the pixels or picture elements of this pixel matrix 12 is composed of a photodiode 13 and a switch 14 that is connected to row lines 15 and column lines 16. The pixel matrix 12 is applied on a glass substrate 20.

All pixels of a line are simultaneously addressed by line drivers 17 and read out. In the simplest case, an image is progressively read out line-by-line. The signals are supplied to a processing circuit 18 wherein the signals are processed in parallel in a number of amplifiers and are combined by multiplexers and are converted—in an analog/digital converter (A/D converter)—into a digital output signal for further processing.

Figure 3:
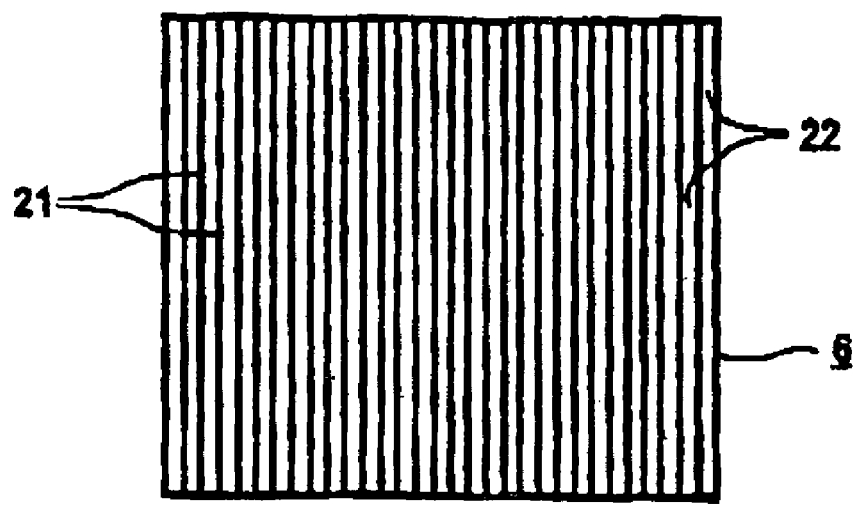
FIG. 3 illustrates a conventional stray radiation with a regular structure.

FIG. 3 shows a known stray radiation grid 6 that has a regular structure. It is composed of a number of lamellae 21 made of a highly absorbent material such as, for example, lead. The interspaces 22 are filled out with a highly X-ray-transparent material such as, for example, paper. The lamellae 21 all have the same spacing from lamellae to lamellae, so that the illustrated, regular structure exists.

Figure 4:
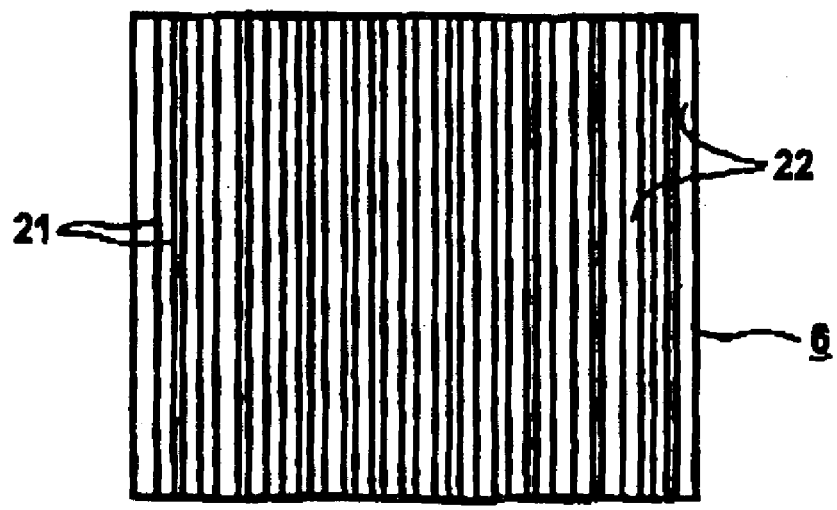
FIG. 4 illustrates a stray radiation grid with a randomly distributed arrangement of the distances between the lamellae.

FIG. 4 shows an inventive stray radiation grid 6 with an irregular structure. The lamellae 21 exhibit a randomly distributed arrangement of the distances between the lamellae within certain limit values but nonetheless produce a comparable X-ray transparency, so that the illustrated, irregular structure exists. The effect is utilized that aliasing effects are suppressed when one of the two digital patterns (in the position domain or time domain) has an irregular structure. The afore-mentioned aliasing effects arise when both digital patterns are regular.

Aliasing artifacts are suppressed due to the random arrangement of the lamellae 21 of the stray radiation grid 6 within certain limits while preserving average characteristics such as transparency and stray radiation absorption.

Although modifications and changes may be suggested by those skilled in the art, it is the intention of the inventor to embody within the patent warranted hereon all changes and modifications as reasonably and properly come within the scope of his contribution to the art.

I claim as my invention:

1. An X-ray diagnostic apparatus comprising:

an X-ray source which emits X-rays;

a digital X-ray detector disposed for acquiring said X-rays and converting X-rays incident on said detector into an electrical signal sequence representing picture elements;

a stray radiation grid, disposed between said X-ray source and said X-ray detector, said stray radiation grid being formed by X-ray-absorbent material and X-ray-transparent material in alternation, and said stray radiation grid being comprised of a plurality of lamella, said lamellae being disposed at irregular intervals relative to each other;

an image system supplied with said electrical signal sequence for processing said electrical signal sequence to form image signals dependent on said picture elements; and a playback device connected to said image system for producing a visual representation from said image signals.

2. An X-ray diagnostic apparatus as claimed in claim 1, wherein said lamellae are composed of X-ray absorbent material.

3. An X-ray diagnostic apparatus as claimed in claim 2, wherein said lamellae consist of lead, and wherein said X-ray transparent material consists of paper.

4. An X-ray diagnostic apparatus as claimed in claim 3, wherein each of said paper and said lead lamella has a thickness, and wherein the respective thicknesses of said paper and said lead lamella vary over said stray radiation grid.

5. An X-ray diagnostic apparatus as claimed in claim 2, wherein an average number of said lamella per unit length is constant within a selected distance in said stray radiation grid.

6. An X-ray diagnostic apparatus as claimed in claim 2, wherein said lamellae are stochastically distributed in said stray radiation grid.

7. An X-ray diagnostic apparatus comprising:

an X-ray source that emits X-rays;

a digital X-ray detector disposed for acquiring said X-rays and converting X-rays incident on said detector into an electrical signal sequence representing picture elements, said picture elements of said digital X-ray detector being disposed at irregular intervals;

a stray radiation grid, disposed between said X-ray source and said X-ray detector, formed by X-ray absorbent material and X-ray transparent material in alternation;

an image system supplied with said electrical signal sequence for processing said electrical signal sequence to form image signals dependent on said picture elements; and a playback device connected to said image system for producing a visual representation from said image signals.

8. An X-ray diagnostic apparatus as claimed in claim 7, wherein said picture elements are disposed in rows and columns, and wherein at least one of said columns and rows is irregular.

9. An X-ray diagnostic apparatus comprising:

an X-ray source that emits X-rays;

a digital X-ray detector disposed for acquiring said X-rays and converting X-rays incident on said detector into an electrical signal sequence representing picture elements of said digital X-ray detector;

a stray radiation grid, disposed between said X-ray source and said X-ray detector, formed by X-ray absorbent material and X-ray transparent material in alternation, said stray radiation grid comprising a plurality of lamella of said X-ray absorbent material, and said picture elements of said X-ray detector exhibiting irregular spacings in a direction perpendicular to said lamella;

an image system supplied with said electrical signal sequence for processing said electrical signal sequence to form image signals dependent on said picture elements; and a playback device connected to said image system for producing a visual representation from said image signals.

10. An X-ray diagnostic apparatus as claimed in claim 9, wherein said lamellae consist of lead, and wherein said X-ray transparent material consists of paper.

* * * * *